(12) United States Patent
Sridharan et al.

(10) Patent No.: US 12,335,881 B2
(45) Date of Patent: Jun. 17, 2025

(54) POWER-EFFICIENT SIDELINK SYNCHRONIZATION SIGNAL TRANSMISSION

(71) Applicant: QUALCOMM Incorporated, San Diego, CA (US)

(72) Inventors: Gokul Sridharan, Sunnyvale, CA (US); Huilin Xu, San Diego, CA (US); Seyedkianoush Hosseini, San Diego, CA (US); Karthika Paladugu, San Diego, CA (US); Wei Yang, San Diego, CA (US); Peter Pui Lok Ang, San Diego, CA (US); Sudhir Kumar Baghel, Hillsborough, NJ (US); Krishna Kiran Mukkavilli, San Diego, CA (US); Tingfang Ji, San Diego, CA (US)

( * ) Notice: Subject to any disclaimer, the term of this patent is extended or adjusted under 35 U.S.C. 154(b) by 234 days.

(21) Appl. No.: 17/248,335

(22) Filed: Jan. 20, 2021

(65) Prior Publication Data

US 2021/0227480 A1 Jul. 22, 2021

Related U.S. Application Data

(60) Provisional application No. 62/963,957, filed on Jan. 21, 2020.

(51) Int. Cl.
*H04W 56/00* (2009.01)
(52) U.S. Cl.
CPC ............... *H04W 56/001* (2013.01)
(58) Field of Classification Search
CPC .................................................. Y02D 30/70
See application file for complete search history.

(56) References Cited

U.S. PATENT DOCUMENTS

| 11,122,520 B2 | 9/2021 | Xu et al. |
| 11,509,364 B2 | 11/2022 | Chakraborty et al. |

(Continued)

FOREIGN PATENT DOCUMENTS

| JP | 6513222 B2 * | 5/2019 | .......... H04W 56/001 |
| WO | 2015042261 A1 | 3/2015 | |

(Continued)

OTHER PUBLICATIONS

Machine translation of JP 6513222 (Year: 2019).*

(Continued)

*Primary Examiner* — Kenny S Lin
*Assistant Examiner* — Rodrick Mak

(57) ABSTRACT

Various aspects of the present disclosure generally relate to wireless communication. In some aspects, a user equipment (UE) may detect an out-of-coverage scenario based at least in part on determining that a synchronization source associated with a wireless network is unavailable or has a signal strength that fails to satisfy a threshold. The UE may transmit, on a sidelink channel, a sidelink synchronization signal in a transmission period that includes a plurality of synchronization signal occasions based at least in part on the out-of-coverage scenario. In some aspects, the UE may transmit the sidelink synchronization signal according to a reduced duty cycle that causes the sidelink synchronization signal to be transmitted during fewer than all of the plurality of synchronization signal occasions. Numerous other aspects are provided.

30 Claims, 10 Drawing Sheets

(56) References Cited

U.S. PATENT DOCUMENTS

| | | | |
|---|---|---|---|
| 2008/0311865 A1* | 12/2008 | Worfolk | H04W 52/225 |
| | | | 370/336 |
| 2017/0013577 A1* | 1/2017 | Berggren | H04B 7/2656 |
| 2017/0048041 A1* | 2/2017 | Yi | H04W 52/0206 |
| 2017/0289940 A1 | 10/2017 | Yang et al. | |
| 2018/0324718 A1 | 11/2018 | Serrano et al. | |
| 2018/0359790 A1* | 12/2018 | Ingale | H04W 74/08 |
| 2018/0368090 A1* | 12/2018 | Kadambar | H04W 8/005 |
| 2019/0098589 A1* | 3/2019 | Chae | H04W 72/048 |
| 2020/0174051 A1* | 6/2020 | Wiezell | H04L 7/0332 |
| 2020/0229209 A1* | 7/2020 | Sorrentino | H04W 72/569 |

FOREIGN PATENT DOCUMENTS

| | | | |
|---|---|---|---|
| WO | WO-2017078783 A1 * | 5/2017 | |
| WO | 2018169635 A2 | 9/2018 | |

OTHER PUBLICATIONS

Intel Corporation: "Discussion on Synchronization Options for D2D Operation", 3GPP TSG RAN WG1 Meeting #74, 3GPP Draft; R1-133162—Intel-On Synchronization for D2D, 3rd Generation Partnership Project (3GPP), Mobile Competence Centre; 650, Route Des Lucioles; F-06921 Sophia-Antipolis Cedex; France, vol. RAN WG1, No. Barcelona, Spain; Aug. 19-Aug. 23, 2013, Aug. 10, 2013 (Aug. 10, 2013), pp. 1-4, XP050716372, Retrieved from the Internet: URL: http://www.3gpp.org/ftp/tsg_ran/WG1_RL1/TSGR1_74/Docs/.

Intel Corporation: "Discussion on Synchronization Options for D2D Operation", 3GPP TSG RAN WG1 Meeting #74, 3GPP Draft; R1-133162—Intel-On Synchronization for D2D, 3rd Generation Partnership Project (3GPP), Mobile Competence Centre; 650, Route Des Lucioles; F-06921 Sophia-Antipolis Cedex; France, vol. RAN WG1, No. Barcelona, Spain; Aug. 19-Aug. 23, 2013, Aug. 10, 2013 (Aug. 10, 2013), pp. 1-4, XP050716372, Retrieved from the Internet: URL: http://www.3gpp.org/ftp/tsg_ran/WG1_RL1/TSGR1_74/Docs/ [retrieved on Aug. 10, 2013], Section 4.

International Search Report and Written Opinion—PCT/US2021/070058—ISA/EPO—Apr. 30, 2021.

* cited by examiner

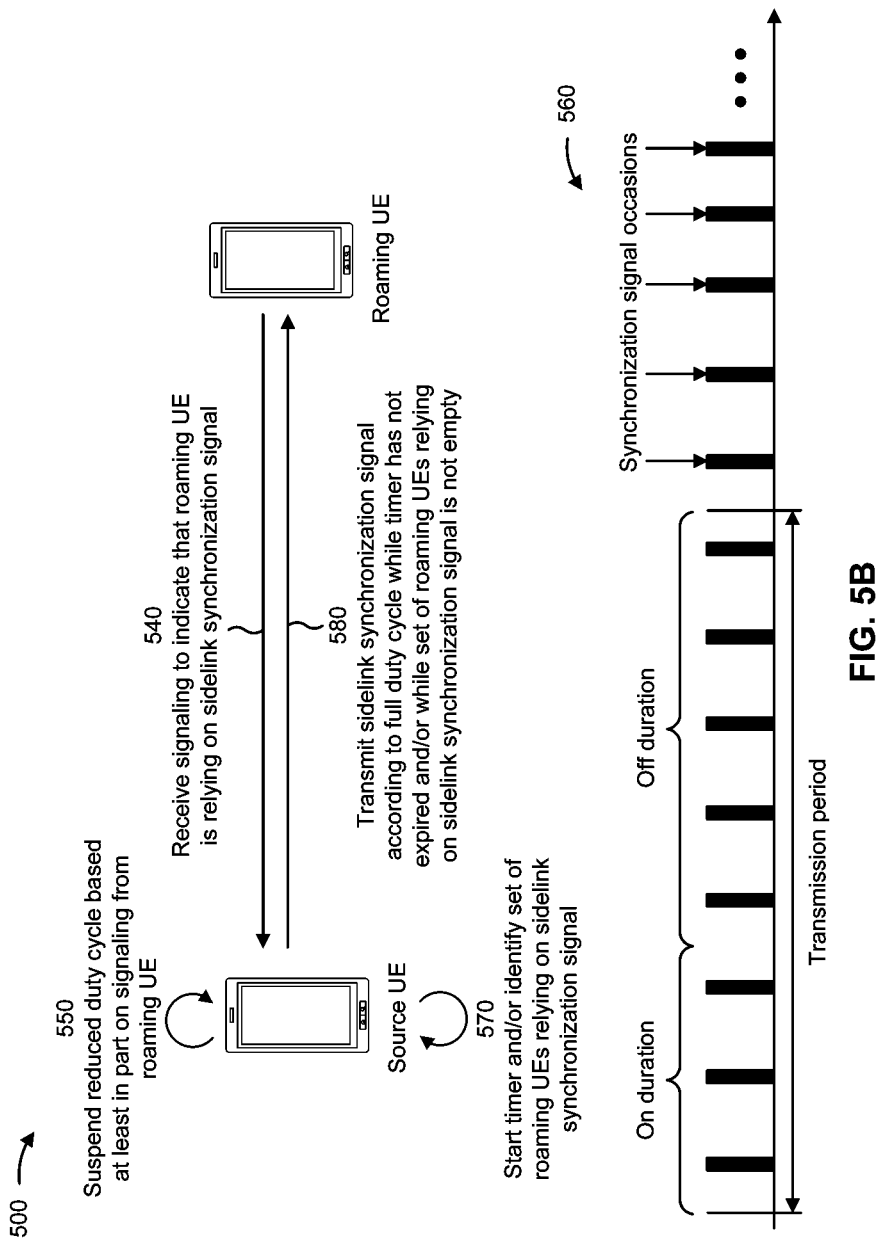

POWER-EFFICIENT SIDELINK SYNCHRONIZATION SIGNAL TRANSMISSION

CROSS-REFERENCE TO RELATED APPLICATION

This Patent application claims priority to U.S. Provisional Patent Application No. 62/963,957, filed on Jan. 21, 2020, entitled "POWER-EFFICIENT SIDELINK SYNCHRONIZATION SIGNAL TRANSMISSION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for power-efficient sidelink synchronization signal transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies and the telecommunication standards that employ these technologies remain useful.

SUMMARY

In some aspects, a method of wireless communication, performed by a user equipment (UE), may include: detecting an out-of-coverage scenario based at least in part on determining that a synchronization source associated with a wireless network is unavailable or has a signal strength that fails to satisfy a threshold; and transmitting, on a sidelink channel, a sidelink synchronization signal in a transmission period that includes a plurality of synchronization signal occasions based at least in part on the out-of-coverage scenario, wherein the sidelink synchronization signal is transmitted according to a reduced duty cycle that causes the sidelink synchronization signal to be transmitted during fewer than all of the plurality of synchronization signal occasions.

In some aspects, a UE for wireless communication may include a memory and one or more processors operatively coupled to the memory. The memory and the one or more processors may be configured to: detect an out-of-coverage scenario based at least in part on determining that a synchronization source associated with a wireless network is unavailable or has a signal strength that fails to satisfy a threshold; and transmit, on a sidelink channel, a sidelink synchronization signal in a transmission period that includes a plurality of synchronization signal occasions based at least in part on the out-of-coverage scenario, wherein the sidelink synchronization signal is transmitted according to a reduced duty cycle that causes the sidelink synchronization signal to be transmitted during fewer than all of the plurality of synchronization signal occasions.

In some aspects, a non-transitory computer-readable medium may store one or more instructions for wireless communication. The one or more instructions, when executed by one or more processors of a UE, may cause the one or more processors to: detect an out-of-coverage scenario based at least in part on determining that a synchronization source associated with a wireless network is unavailable or has a signal strength that fails to satisfy a threshold; and transmit, on a sidelink channel, a sidelink synchronization signal in a transmission period that includes a plurality of synchronization signal occasions based at least in part on the out-of-coverage scenario, wherein the sidelink synchronization signal is transmitted according to a reduced duty cycle that causes the sidelink synchronization signal to be transmitted during fewer than all of the plurality of synchronization signal occasions.

In some aspects, an apparatus for wireless communication may include: means for detecting an out-of-coverage scenario based at least in part on determining that a synchronization source associated with a wireless network is unavailable or has a signal strength that fails to satisfy a threshold; and means for transmitting, on a sidelink channel, a sidelink synchronization signal in a transmission period that includes a plurality of synchronization signal occasions based at least in part on the out-of-coverage scenario, wherein the sidelink synchronization signal is transmitted according to a reduced duty cycle that causes the sidelink synchronization signal to be transmitted during fewer than all of the plurality of synchronization signal occasions.

In some aspects, a method of wireless communication, performed by a UE, may include: searching for a synchronization signal based at least in part on determining that a synchronization source associated with a wireless network is unavailable or has a signal strength that fails to satisfy a threshold; detecting, on a sidelink channel, a sidelink synchronization signal transmitted by a source UE in a transmission period that includes a plurality of synchronization signal occasions, wherein the sidelink synchronization signal is transmitted by the source UE according to a reduced duty cycle that causes the sidelink synchronization signal to be detected in fewer than all of the plurality of synchronization signal occasions; and transmitting, to the source UE, signaling to indicate reliance on the sidelink synchronization signal as a synchronization source, wherein the signaling causes the source UE to suspend the reduced duty cycle such that the sidelink synchronization signal is transmitted in all of the plurality of synchronization signal occasions.

In some aspects, a UE for wireless communication may include a memory and one or more processors operatively coupled to the memory. The memory and the one or more processors may be configured to search for a synchronization signal based at least in part on determining that a synchronization source associated with a wireless network is unavailable or has a signal strength that fails to satisfy a threshold; transmit, to the source UE, signaling to indicate reliance on the sidelink synchronization signal as a synchronization source, wherein the signaling causes the source UE to suspend the reduced duty cycle such that the sidelink synchronization signal is transmitted in all of the plurality of synchronization signal occasions.

In some aspects, a non-transitory computer-readable medium may store one or more instructions for wireless communication. The one or more instructions, when executed by one or more processors of a UE, may cause the one or more processors to: search for a synchronization signal based at least in part on determining that a synchronization source associated with a wireless network is unavailable or has a signal strength that fails to satisfy a threshold; transmit, to the source UE, signaling to indicate reliance on the sidelink synchronization signal as a synchronization source, wherein the signaling causes the source UE to suspend the reduced duty cycle such that the sidelink synchronization signal is transmitted in all of the plurality of synchronization signal occasions.

In some aspects, an apparatus for wireless communication may include: means for searching for a synchronization signal based at least in part on determining that a synchronization source associated with a wireless network is unavailable or has a signal strength that fails to satisfy a threshold; means for detecting, on a sidelink channel, a sidelink synchronization signal transmitted by a source UE in a transmission period that includes a plurality of synchronization signal occasions, wherein the sidelink synchronization signal is transmitted by the source UE according to a reduced duty cycle that causes the sidelink synchronization signal to be detected in fewer than all of the plurality of synchronization signal occasions; and means for transmitting, to the source UE, signaling to indicate reliance on the sidelink synchronization signal as a synchronization source, wherein the signaling causes the source UE to suspend the reduced duty cycle such that the sidelink synchronization signal is transmitted in all of the plurality of synchronization signal occasions.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5B are diagrams illustrating one or more examples of power-efficient sidelink synchronization signal transmission, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
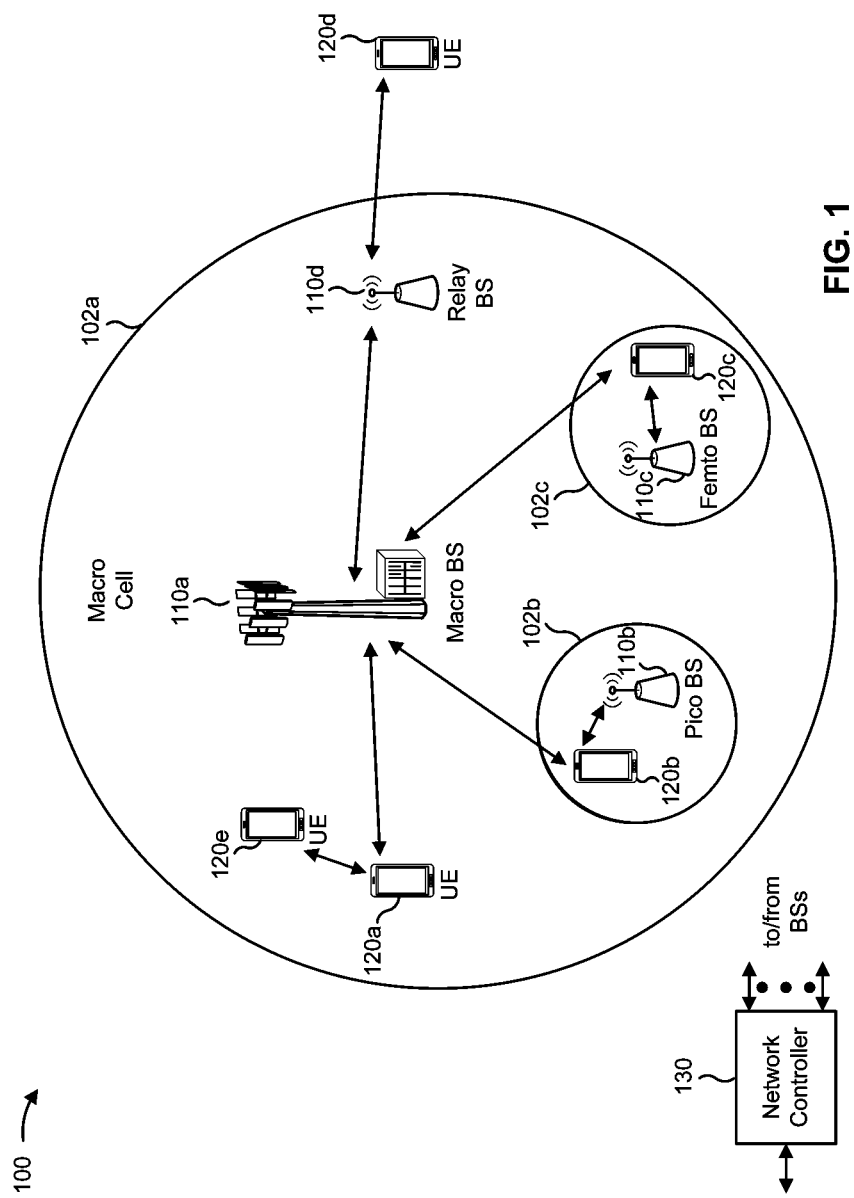
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things)

devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, synchronization signal transmissions, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHZ, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHZ). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
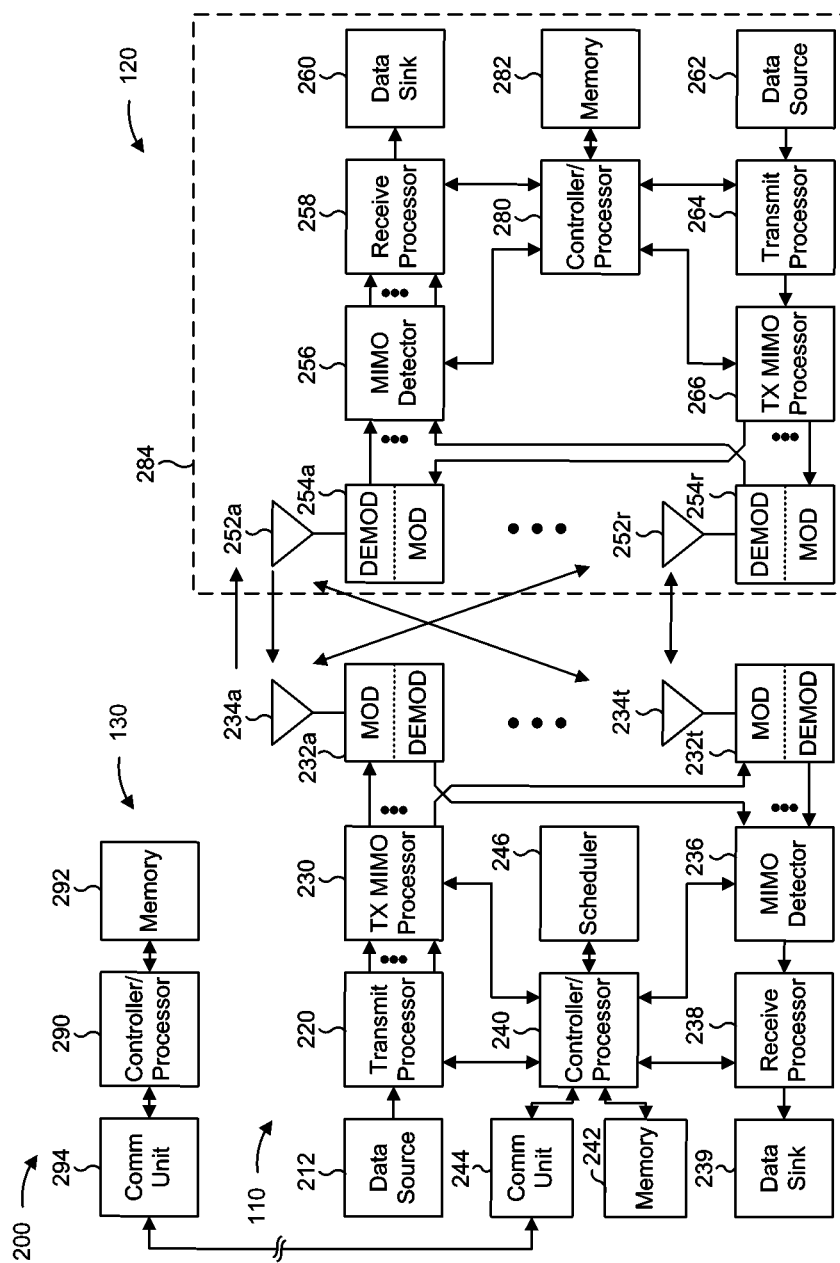
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with power-efficient sidelink synchronization signal transmission, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes described herein. In some aspects, executing instructions may include running the instructions, converting the instructions, compiling the instructions, interpreting the instructions, and/or the like.

In some aspects, UE 120 may include means for detecting an out-of-coverage scenario based at least in part on determining that a synchronization source associated with a wireless network is unavailable or has a signal strength that fails to satisfy a threshold, means for transmitting, on a sidelink channel, a sidelink synchronization signal in a transmission period that includes a plurality of synchronization signal occasions according to a reduced duty cycle that causes the sidelink synchronization signal to be transmitted during fewer than all of the plurality of synchronization signal occasions, and/or the like.

Additionally, or alternatively, UE 120 may include means for searching for a synchronization signal based at least in part on determining that a synchronization source associated with a wireless network is unavailable or has a signal strength that fails to satisfy a threshold, means for detecting, on a sidelink channel, a sidelink synchronization signal transmitted by a source UE 120 in a transmission period that includes a plurality of synchronization signal occasions, wherein the sidelink synchronization signal is transmitted by the source UE 120 according to a reduced duty cycle that causes the sidelink synchronization signal to be detected in fewer than all of the plurality of synchronization signal occasions, means for transmitting, to the source UE 120, signaling to indicate reliance on the sidelink synchronization signal as a synchronization source, wherein the signaling causes the source UE 120 to suspend the reduced duty cycle such that the sidelink synchronization signal is transmitted in all of the plurality of synchronization signal occasions, and/or the like.

In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
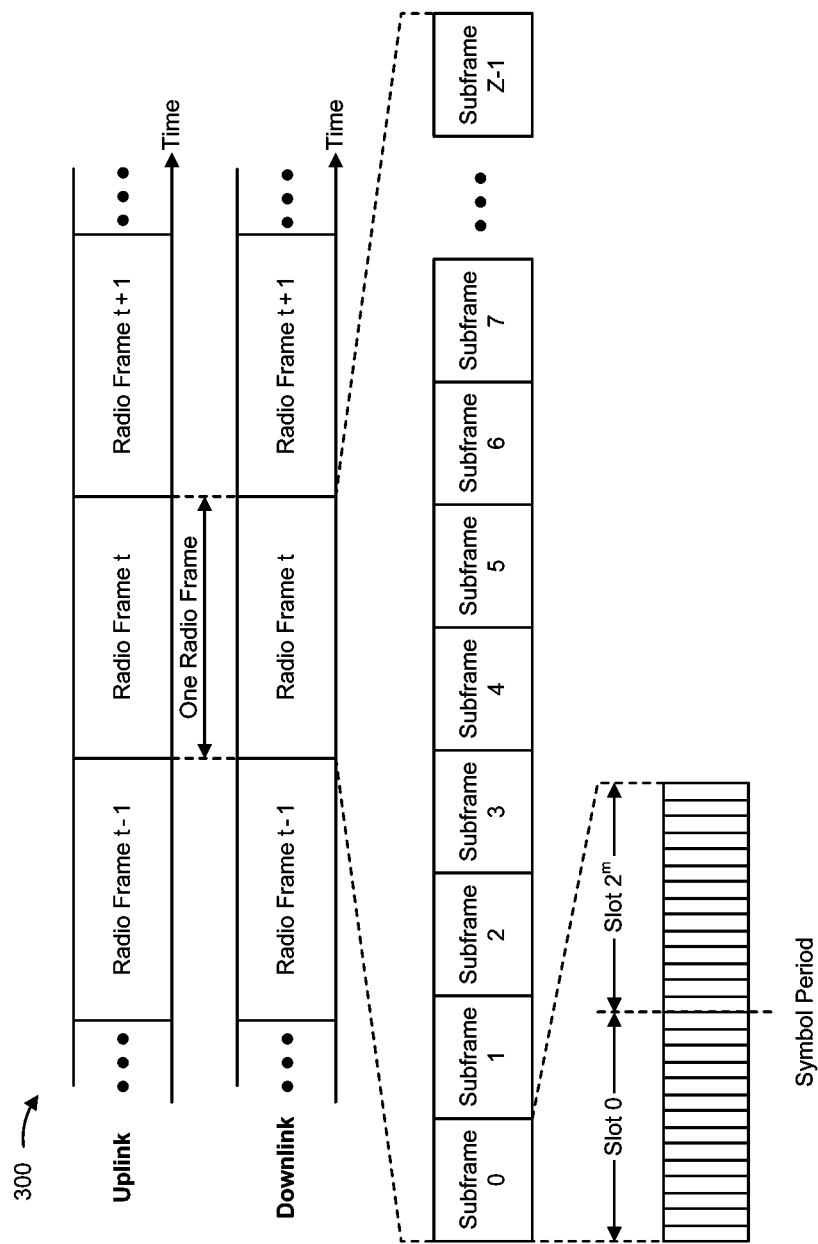
FIG. 3 is a diagram illustrating an example of a frame structure in a wireless network, in accordance with various aspects of the present disclosure.

FIG. 3 shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1 ms) and may include a set of slots (e.g., $2^m$ slots per subframe are shown in FIG. 3, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3 may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 4.

As indicated above, FIG. 3 is provided as an example. Other examples may differ from what is described with regard to FIG. 3.

Figure 4:
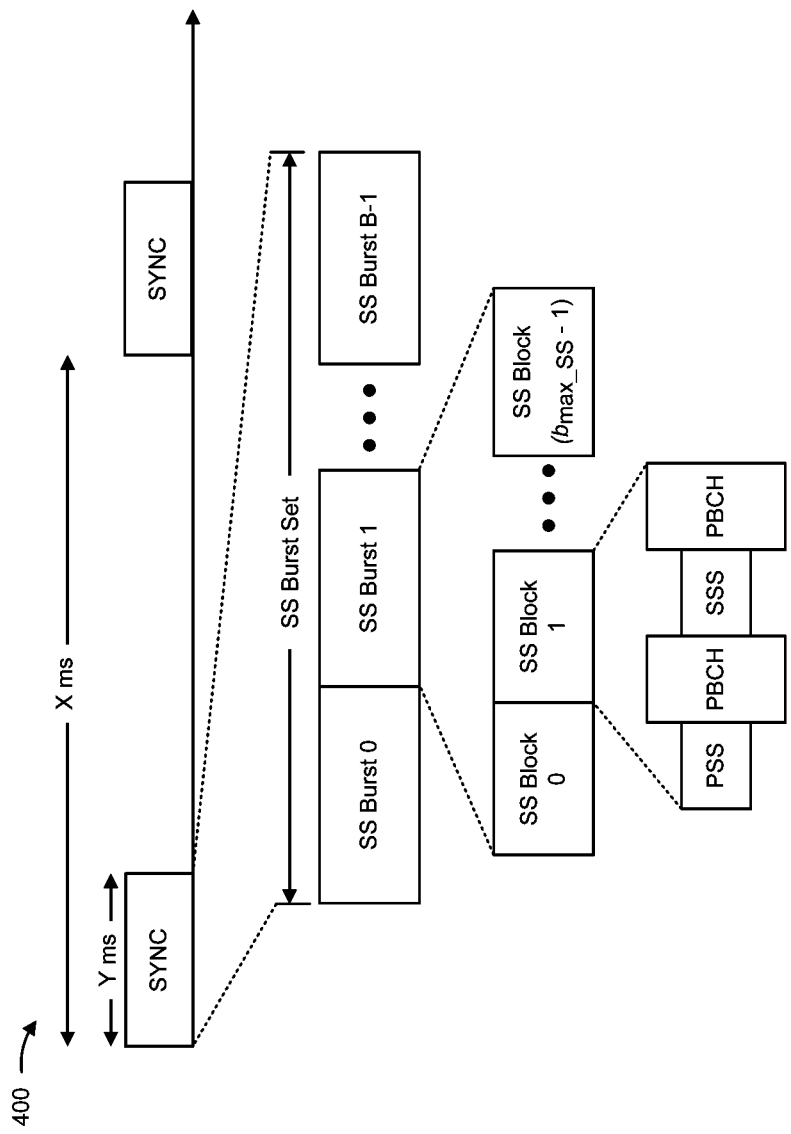
FIG. 4 is a diagram illustrating an example synchronization communication hierarchy in a wireless network, in accordance with various aspects of the present disclosure.

FIG. 4 is a block diagram illustrating an example 400 of an SS hierarchy, which is an example of a synchronization communication hierarchy. As shown in FIG. 4, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_ss}$−1), where $b_{max\_ss}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 4. In some aspects, an SS burst set may have a fixed or dynamic length, shown as Y milliseconds in FIG. 4.

The SS burst set shown in FIG. 4 is an example of a synchronization communication set, and other synchronization communication sets may be used in connection with the techniques described herein. Furthermore, the SS block shown in FIG. 4 is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 4. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIG. 4 is provided as an example. Other examples may differ from what is described with regard to FIG. 4.

In a wireless network, such as an LTE network, an NR network, and/or the like, a UE may search for one or more synchronization signals (e.g., a PSS, an SSS, a PBCH, and/or the like) to establish a reference time, determine symbol timing, determine frame timing, and/or acquire other information to support initial access before other communications can begin. In general, a UE may search for and select a synchronization source from a set of neighboring devices that may be ranked according to one or more factors, such as a priority (e.g., based on a type of the neighboring devices), a received signal strength, and/or the like. In some cases, however, a UE may be in an out-of-coverage scenario when the UE cannot find a suitable synchronization source (e.g., a base station associated with a wireless network, a transmitter associated with a global navigation satellite system (GNSS), and/or the like). Additionally, or alternatively, the UE may be in an out-of-coverage scenario when the UE is connected to a synchronization source that has a signal strength that fails to satisfy a threshold.

In such cases, the UE in the out-of-coverage scenario may decide to become a synchronization source. For example, the UE in the out-of-coverage scenario may start to transmit synchronization signals to establish a reference time to which other devices can synchronize in order to establish sidelink communications with another UE to implement any suitable sidelink use case (e.g., public safety, proximity services, UE-to-network relaying, device-to-device (D2D) communications, mission-critical mesh, and/or the like). When the UE decides to become a synchronization source, the UE may generally need to periodically transmit the synchronization signal (e.g., according to a configured periodicity, such as every 160 milliseconds). However, periodically transmitting the synchronization signal can be power-intensive, as the UE may need to periodically wake up from a low-power mode specifically to transmit the synchronization signal. Furthermore, the UE may transmit the synchronization signal at a high power level (e.g., close to a maximum power rating associated with a power amplifier) in order to maximize a coverage range of the synchronization signal. Accordingly, although the UE may need to periodically transmit the synchronization signal at a high power in order to enhance sidelink coverage and bring nearby roaming UEs to within a single synchronization cluster, transmitting the synchronization signal can consume significant power (e.g., battery) and other resources of the UE.

Some aspects described herein provide techniques and apparatuses to enable power-efficient sidelink synchronization signal transmission without compromising overall sidelink performance and stability. For example, when a UE is in an out-of-coverage scenario because an external synchronization source is unavailable or has a signal strength that fails to satisfy a threshold, the UE may initially transmit a synchronization signal on a sidelink channel according to a reduced duty cycle to conserve power. For example, a synchronization signal transmission period may include a plurality of synchronization signal occasions, and the reduced duty cycle may cause the UE to refrain from transmitting the synchronization signal in one or more of the synchronization signal occasions in the synchronization signal transmission period. Furthermore, in some aspects, a roaming UE that detects the synchronization signal may transmit signaling to indicate that the roaming UE is relying on the synchronization signal as a synchronization source. In this case, the UE may suspend the reduced duty cycle and transmit the synchronization signal according to a full duty cycle until one or more conditions are satisfied (e.g., until a timer expires, a set of roaming UEs relying on the synchronization signal is empty, and/or the like). In this way, transmitting the synchronization signal at the full duty cycle may enhance sidelink performance and reliability for the roaming UEs relying on the synchronization signal. Furthermore, in some aspects, the UE may reactivate the reduced duty cycle when one or more conditions are satisfied (e.g., when the timer expires, the set of roaming UEs relying on the synchronization signal is empty, and/or the like). In this way, when there are no other roaming UEs relying on the synchronization signal, the UE may resume the reduced duty cycle to conserve power.

Figure 5A:
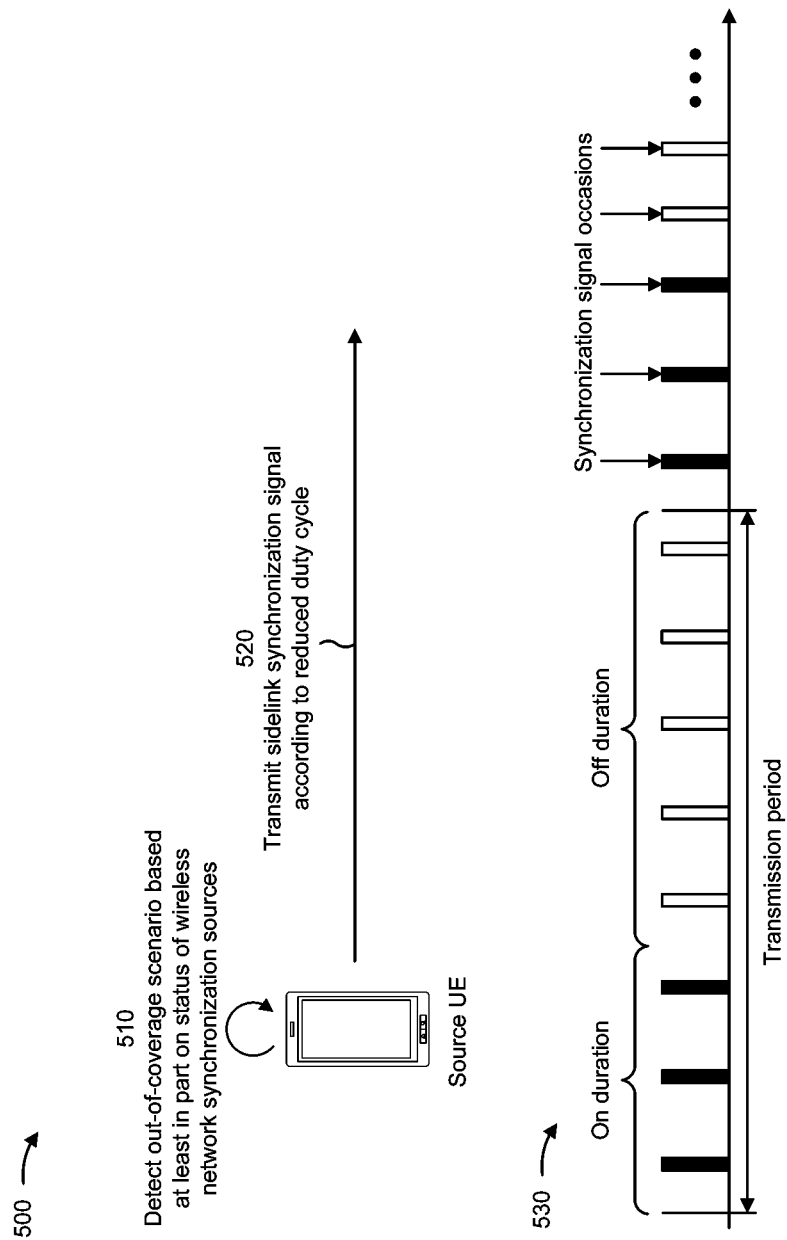

FIGS. 5A-5B are diagrams illustrating one or more examples 500 of power-efficient sidelink synchronization signal transmission, in accordance with various aspects of the present disclosure. As shown in FIGS. 5A-5B, example(s) 500 may include a first UE that may act as a synchronization source, and a second UE that may detect and rely upon sidelink synchronization signals transmitted by the first UE (e.g., while roaming, in an out-of-coverage scenario, and/or the like). Accordingly, as described herein, the first UE may be referred to as a source UE and the second UE may be referred to as a roaming UE. In some aspects, the source UE and the roaming UE may correspond to one or more UEs described elsewhere herein (e.g., UE 120*a* and UE 120*e* in FIG. 1, UE 120 in FIG. 2, and/or the like).

As shown in FIG. 5A, and by reference number 510, the source UE may detect an out-of-coverage scenario based at least in part on a status of one or more wireless network synchronization sources. For example, in some aspects, the source UE may be configured with one or more synchronization priority rules that define a priority order in which the source UE is to search a wireless network for a suitable synchronization source. For example, the source UE may be configured to perform GNSS-based synchronization, in which case a GNSS transmitter may be associated with a highest priority. Accordingly, if the source UE is unable to locate a suitable GNSS transmitter, the source UE may then search for another synchronization source in a descending priority order, where lower-priority synchronization sources may include UEs that are directly synchronized to a GNSS transmitter, UEs that are indirectly synchronized to a GNSS transmitter, base stations associated with a wireless network, UEs that are directly synchronized to a base station, and UEs that are indirectly synchronized to a base station, with any remaining UEs having a lowest priority.

Additionally, or alternatively, the source UE may be configured to perform base station-based synchronization, in which case a base station associated with a wireless network may be associated with a highest priority, and lower-priority synchronization sources may include UEs that are directly synchronized to a base station, UEs that are indirectly synchronized to a base station, GNSS transmitters, UEs that are directly synchronized to a GNSS transmitter, and UEs that are indirectly synchronized to a GNSS transmitter, with any remaining UEs having a lowest priority.

Accordingly, in cases where the source UE is unable to find a suitable synchronization source, or where all available synchronization sources have a signal strength that fails to satisfy a threshold, the source UE may detect the out-of-coverage scenario and decide to become a synchronization source. For example, in one use case, the source UE may be unable to find a GNSS-based or base station-based synchronization source because the source UE is in a remote area, and may decide to become a synchronization source in order to establish sidelink communications with another roaming UE (e.g. a roaming UE that may be used in connection with a search-and-rescue operation). Additionally, or alternatively, the source UE may decide to become a synchronization source to implement another suitable sidelink application (e.g., public safety, proximity services, UE-to-network relaying, device-to-device (D2D) communications, vehicle-to-vehicle (V2V) communications, Internet of Everything (IoE) communications, IoT communications, mission-critical mesh, and/or the like).

As further shown in FIG. 5A, and by reference number 520, the source UE may transmit a sidelink synchronization signal on a sidelink channel according to a reduced duty cycle based at least in part on detecting the out-of-coverage scenario. For example, in some aspects, the sidelink synchronization signal may include a primary sidelink synchronization signal (PSSS) that has similar characteristics as a PSS transmitted by a base station (e.g., conveying information that a roaming UE may use to determine symbol timing), a secondary sidelink synchronization signal (SSSS) that has similar characteristics as an SSS transmitted by a base station (e.g., conveying information that a roaming UE may use to determine frame timing), a physical sidelink broadcast channel (PSBCH) that has similar characteristics as a PBCH transmitted by a base station (e.g., conveying system information that supports initial sidelink access), and/or the like.

As further shown in FIG. 5A, and by reference number 530, a transmission period for the sidelink synchronization signal may include a plurality of synchronization signal occasions in which the sidelink synchronization signal may be transmitted. For example, as shown, the transmission period may include an on duration and an off duration, each of which covers a subset of the synchronization signal occasions in the transmission period. Accordingly, rather than transmitting the sidelink synchronization signal in every synchronization signal occasion, which can consume significant power, the source UE may apply the reduced duty cycle such that the sidelink synchronization signal is transmitted only in the synchronization signal occasions that fall within the on duration. In other words, when applying the reduced duty cycle, the source UE may refrain from transmitting the sidelink synchronization signal in the synchronization signal occasions that fall within the off duration of the transmission period. For example, in FIG. 5A, the transmission period for the sidelink synchronization signal includes eight (8) synchronization signal occasions, and the reduced duty cycle causes the source UE to transmit the sidelink synchronization signal in the first three (3) synchronization signal occasions and to refrain from transmitting the sidelink synchronization signal in the next five (5) synchronization signal occasions.

In this way, the reduced duty cycle may cause the sidelink synchronization signal to be transmitted in fewer than all of the plurality of synchronization signal occasions in the transmission period, thus conserving power for the source UE. Furthermore, it will be appreciated that any suitable reduced duty cycle may be utilized to balance trade-offs between power saving for the source UE and latency for a potential roaming UE to discover the sidelink synchronization signal. For example, the reduced duty cycle may have any suitable value below 100% (e.g., in a transmission period with 8 synchronization signal occasions, a quantity of synchronization signal occasions in which the source UE transmits the sidelink synchronization signal may include any suitable value in a range from one to seven). In this way, the source UE may conserve power by avoiding one or more sidelink synchronization signal transmissions when there are no roaming UEs that are known to be connected to the source UE or otherwise relying upon the sidelink synchronization signal.

As shown in FIG. 5B, and by reference number 540, the source UE may receive, from a roaming UE, signaling to indicate that the roaming UE is relying on the sidelink synchronization signal transmitted by the source UE. For example, in some aspects, the roaming UE may search for and/or detect the sidelink synchronization signal in an out-of-coverage scenario when a high-priority synchronization source is unavailable, associated with a received signal strength that fails to satisfy a threshold, and/or the like. Additionally, or alternatively, the roaming UE may search for and/or detect the sidelink synchronization signal to establish a sidelink connection for another suitable sidelink use case (e.g., public safety, proximity services, UE-to-network relaying, D2D communications, mission-critical mesh, and/or the like).

As further shown in FIG. 5B, and by reference number 550, the source UE may suspend the reduced duty cycle based at least in part on the signaling received from the roaming UE. For example, while applying a reduced duty cycle may help the source UE to conserve power when there are no roaming UEs connected to the source UE or otherwise relying upon the sidelink synchronization signal, blindly following the reduced duty cycle may degrade sidelink performance in cases when one or more roaming UEs are connected to the source UE or otherwise relying upon the sidelink synchronization signal. Accordingly, in cases where the source UE receives signaling to indicate that the roaming UE is relying upon the sidelink synchronization signal as a synchronization source, the source UE may suspend the reduced duty cycle and start to transmit the periodic sidelink synchronization signal according to a full duty cycle. For example, as shown by reference number 560, the source UE may transmit the sidelink synchronization signal in all of the synchronization signal occasions when the reduced duty cycle is suspended. In this way, suspending the reduced duty cycle and applying the full duty cycle for the sidelink synchronization transmissions may improve sidelink performance and reliability when one or more roaming UEs are connected to the source UE or otherwise relying upon the sidelink synchronization signal.

As further shown in FIG. 5B, and by reference number 570, the source UE may start a timer and/or identify a set of roaming UEs that are relying on the sidelink synchronization signal based at least in part on suspending the reduced duty cycle. For example, in some aspects, the source UE may use the timer and/or information related to the set of roaming UEs that are relying on the sidelink synchronization signal as one or more mechanisms to reactivate the reduced duty cycle in cases where the source UE ceases to act as a synchronization source for other (roaming) UEs. In this case, the source UE may add the roaming UE that provided the signaling to indicate reliance on the sidelink synchronization signal to the set of roaming UEs that are relying on the sidelink synchronization signal. Furthermore, any other roaming UEs that subsequently provide such signaling may be added to the set of roaming UEs that are relying on the sidelink synchronization signal.

As further shown in FIG. 5B, and by reference number 580, the source UE may transmit the sidelink synchronization signal according to the full duty cycle while the timer has not expired and/or while the set of roaming UEs relying on the sidelink synchronization signal is not empty. For example, as described above, the source UE may start the timer upon suspending the reduced duty cycle, and the timer may be reset if one or more events occur. For example, in some aspects, the source UE may reset the timer if the source UE sends a transmission to the roaming UE that is relying on the source UE as a synchronization source, receives a signal from the roaming UE relying on the source UE as a synchronization source, or receives signaling or another suitable notification from another roaming UE indicating that the other roaming UE is relying on the source UE as a synchronization source. Accordingly, in some aspects, the source UE may reactivate the reduced duty cycle whereby the sidelink synchronization signal is transmitted in fewer than all of the synchronization signal occasions in a transmission period if the timer expires.

Additionally, or alternatively, the source UE may maintain a separate timer for each roaming UE in the set of roaming UEs that are relying on the synchronization signal, whereby a particular roaming UE may be removed from the set of roaming UEs that are relying on the synchronization signal if the timer associated with the particular roaming UE expires. In this way, roaming UEs that signal reliance on the sidelink synchronization signal may periodically transmit signaling to indicate that the roaming UE(s) are still relying on the sidelink synchronization signal, and any roaming UEs that do not provide such signaling within a configured time period may be removed from the set of roaming UEs relying on the sidelink synchronization signal. For example, in some aspects, the configured time period may be based on the duration of the timer that is running at the source UE while the reduced duty cycle is suspended (e.g., a common timer used for all roaming UEs or the separate timer used for each roaming UE), and the source UE may indicate the configured time period to the roaming UE(s) relying on the source UE as a synchronization source. Additionally, or alternatively, a roaming UE may be removed from the set of roaming UEs that are relying on the sidelink synchronization signal if the roaming UE signals non-reliance on the sidelink synchronization signal. For example, the roaming UE may come under the coverage of a base station, a GNSS transmitter, another UE that is directly or indirectly synchronized to a base station or a GNSS transmitter, or another suitable synchronization source having a higher priority than the source UE. Accordingly, if the timer expires and/or the set of roaming UEs relying on the sidelink synchronization signal is empty such that there are no roaming UEs relying on the sidelink synchronization signal as a synchronization source, the source UE may reactivate the reduced duty cycle to conserve power.

As indicated above, FIGS. 5A-5B are provided as one or more examples. Other examples may differ from what is described with respect to FIGS. 5A-5B.

Figure 6:
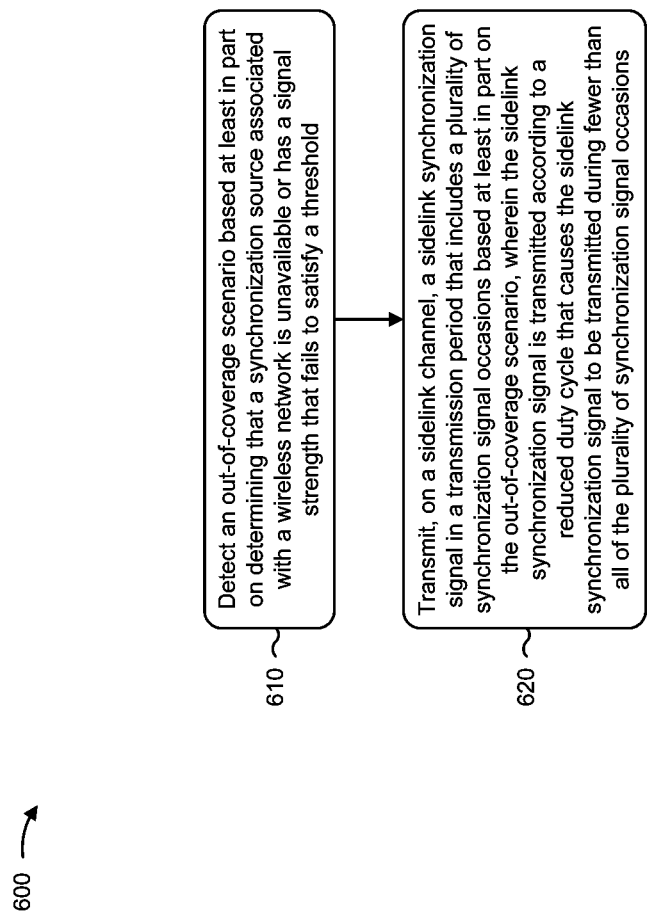
FIGS. 6-7 are diagrams illustrating example processes performed, for example, by a UE, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 and/or the like) performs operations associated with power-efficient sidelink synchronization signal transmission.

As shown in FIG. 6, in some aspects, process 600 may include detecting an out-of-coverage scenario based at least in part on determining that a synchronization source associated with a wireless network is unavailable or has a signal strength that fails to satisfy a threshold (block 610). For example, the UE may detect (e.g., using antenna 252, DEMOD 254, MIMO detector 256, receive processor 258, controller/processor 280, memory 282, and/or the like) an out-of-coverage scenario based at least in part on determining that a synchronization source associated with a wireless network is unavailable or has a signal strength that fails to satisfy a threshold, as described above.

As further shown in FIG. 6, in some aspects, process 600 may include transmitting, on a sidelink channel, a sidelink synchronization signal in a transmission period that includes a plurality of synchronization signal occasions based at least in part on the out-of-coverage scenario, wherein the sidelink synchronization signal is transmitted according to a reduced duty cycle that causes the sidelink synchronization signal to be transmitted during fewer than all of the plurality of synchronization signal occasions (block 620). For example, the UE may transmit (e.g., using controller/processor 280, transmit processor 264, TX MIMO processor 266, MOD 254, antenna 252, and/or the like), on a sidelink channel, a sidelink synchronization signal in a transmission period that includes a plurality of synchronization signal occasions based at least in part on the out-of-coverage scenario, as described above. In some aspects, the sidelink synchronization signal is transmitted according to a reduced duty cycle that causes the sidelink synchronization signal to be transmitted during fewer than all of the plurality of synchronization signal occasions.

Process 600 may include additional aspects, such as any single aspect or any combination of aspects described below and/or in connection with one or more other processes described elsewhere herein.

In a first aspect, the sidelink synchronization signal includes one or more of a PSSS, an SSSS, or a PSBCH.

In a second aspect, alone or in combination with the first aspect, process 600 includes refraining from transmitting the sidelink synchronization signal during one or more of the plurality of synchronization signal occasions based at least in part on the reduced duty cycle.

In a third aspect, alone or in combination with one or more of the first and second aspects, process 600 includes receiving, from a roaming UE, signaling to indicate that the roaming UE is relying on the sidelink synchronization signal as a synchronization source, and suspending the reduced duty cycle based at least in part on the signaling, where suspending the reduced duty cycle causes the sidelink synchronization signal to be transmitted in all of the plurality of synchronization signal occasions.

In a fourth aspect, alone or in combination with one or more of the first through third aspects, process 600 includes starting a timer based at least in part on suspending the reduced duty cycle, where the sidelink synchronization signal is transmitted in all of the plurality of synchronization signal occasions while the timer has not expired.

In a fifth aspect, alone or in combination with one or more of the first through fourth aspects, process 600 includes resetting the timer based at least in part on an event occurring prior to expiration of the timer, where the event may include a transmission to the roaming UE relying on the sidelink synchronization signal as a synchronization source, reception of a signal from the roaming UE relying on the sidelink synchronization signal as a synchronization source, and/or reception of signaling to indicate that one or more roaming UEs are relying on the sidelink synchronization signal as a synchronization source.

In a sixth aspect, alone or in combination with one or more of the first through fifth aspects, process 600 includes reactivating the reduced duty cycle based at least in part on the timer expiring.

In a seventh aspect, alone or in combination with one or more of the first through sixth aspects, process 600 includes identifying a set of roaming UEs that are relying on the sidelink synchronization signal as a synchronization source and reactivating the reduced duty cycle based at least in part on determining that the set is empty such that there are no roaming UEs relying on the sidelink synchronization signal as a synchronization source.

In an eighth aspect, alone or in combination with one or more of the first through seventh aspects, process 600 includes removing a particular roaming UE from the set of roaming UEs that are relying on the sidelink synchronization signal as a synchronization source based at least in part on the particular roaming UE failing to signal reliance on the sidelink synchronization signal within a configured time period or the particular roaming UE signaling non-reliance on the sidelink synchronization signal.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
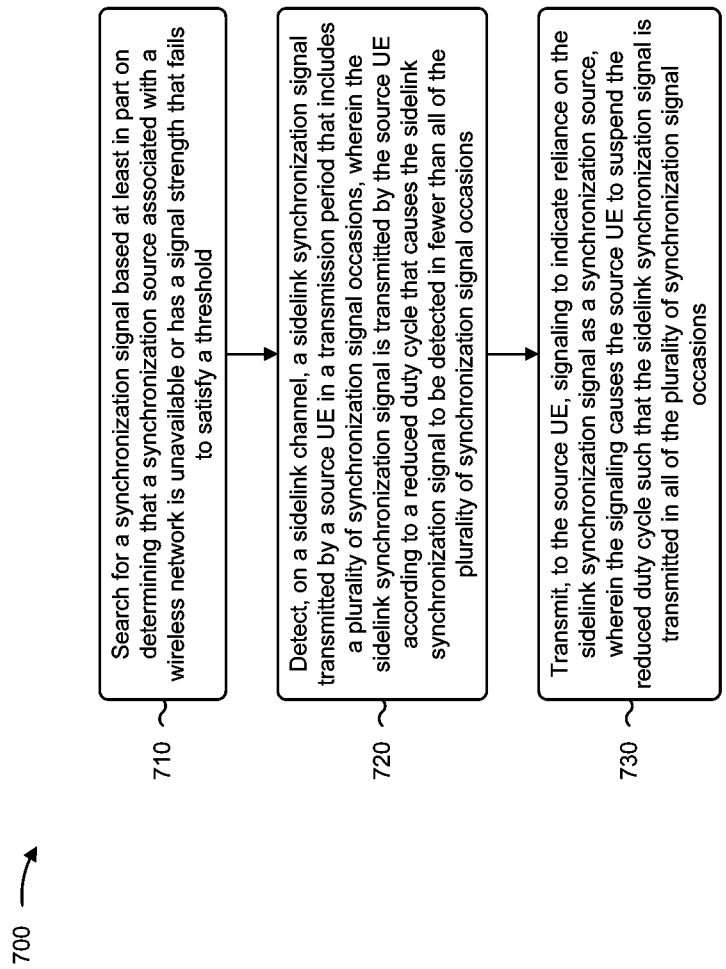

FIG. 7 is a diagram illustrating an example process 700 performed, for example, by a UE, in accordance with various aspects of the present disclosure. Example process 700 is an example where the UE (e.g., UE 120 and/or the like) performs operations associated with power-efficient sidelink synchronization signal transmission.

As shown in FIG. 7, in some aspects, process 700 may include searching for a synchronization signal based at least in part on determining that a synchronization source associated with a wireless network is unavailable or has a signal strength that fails to satisfy a threshold (block 710). For example, the UE may search (e.g., using antenna 252, DEMOD 254, MIMO detector 256, receive processor 258, controller/processor 280, memory 282, and/or the like) for a synchronization signal based at least in part on determining that a synchronization source associated with a wireless network is unavailable or has a signal strength that fails to satisfy a threshold, as described above.

As further shown in FIG. 7, in some aspects, process 700 may include detecting, on a sidelink channel, a sidelink synchronization signal transmitted by a source UE in a transmission period that includes a plurality of synchronization signal occasions, wherein the sidelink synchronization signal is transmitted by the source UE according to a reduced duty cycle that causes the sidelink synchronization signal to be detected in fewer than all of the plurality of synchronization signal occasions (block 720). For example, the UE may detect (e.g., using antenna 252, DEMOD 254, MIMO detector 256, receive processor 258, controller/processor 280, memory 282, and/or the like), on a sidelink channel, a sidelink synchronization signal transmitted by a source UE in a transmission period that includes a plurality of synchronization signal occasions, as described above. In some aspects, the sidelink synchronization signal is transmitted by the source UE according to a reduced duty cycle that causes the sidelink synchronization signal to be detected in fewer than all of the plurality of synchronization signal occasions.

As further shown in FIG. 7, in some aspects, process 700 may include transmitting, to the source UE, signaling to indicate reliance on the sidelink synchronization signal as a synchronization source, wherein the signaling causes the source UE to suspend the reduced duty cycle such that the sidelink synchronization signal is transmitted in all of the plurality of synchronization signal occasions (block 730). For example, the UE may transmit (e.g., using controller/processor 280, transmit processor 264, TX MIMO processor 266, MOD 254, antenna 252, and/or the like), to the source UE, signaling to indicate reliance on the sidelink synchronization signal as a synchronization source, as described above. In some aspects, the signaling causes the source UE to suspend the reduced duty cycle such that the sidelink synchronization signal is transmitted in all of the plurality of synchronization signal occasions.

Process 700 may include additional aspects, such as any single aspect or any combination of aspects described below and/or in connection with one or more other processes described elsewhere herein.

In a first aspect, the sidelink synchronization signal includes one or more of a PSSS, an SSSS, or a PSBCH.

In a second aspect, alone or in combination with the first aspect, process 700 includes transmitting, to the source UE, signaling to indicate non-reliance on the sidelink synchronization signal based at least in part on detecting a synchronization signal from a synchronization source having a higher priority than the source UE.

In a third aspect, alone or in combination with one or more of the first and second aspects, process 700 includes refraining from transmitting, to the source UE, signaling to indicate reliance on the sidelink synchronization signal based at least in part on detecting a synchronization signal from a synchronization source having a higher priority than the source UE.

In a fourth aspect, alone or in combination with one or more of the first through third aspects, the signaling to indicate reliance on the sidelink synchronization signal is periodically transmitted within a configured time period.

In a fifth aspect, alone or in combination with one or more of the first through fourth aspects, process 700 includes receiving, from the source UE, information indicating the configured time period.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
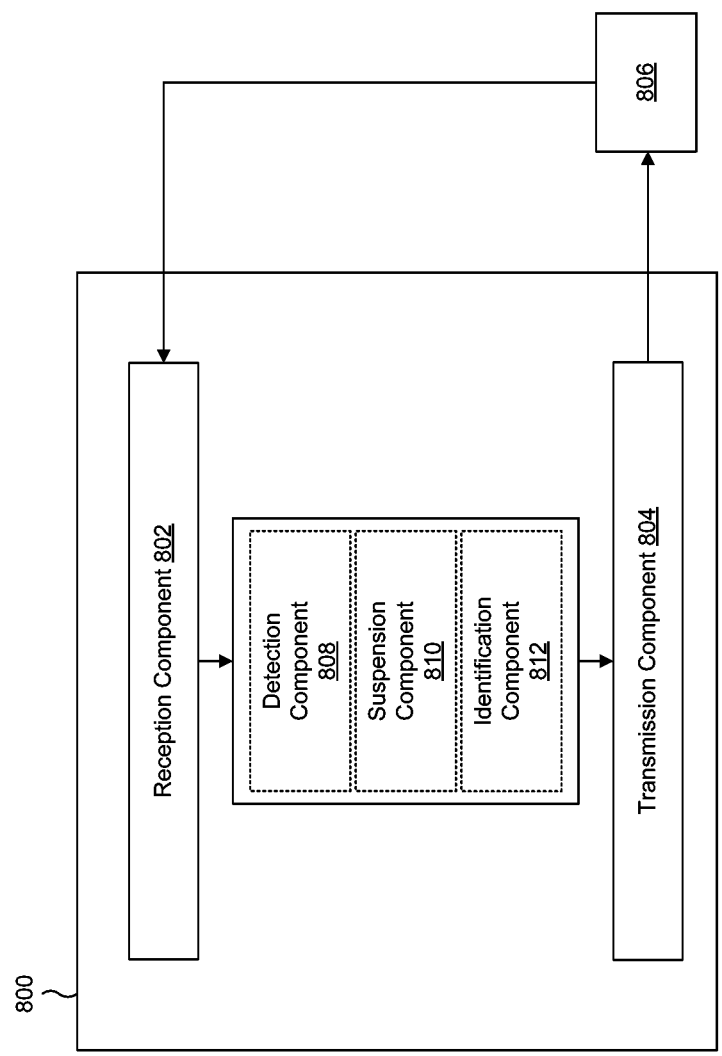
FIGS. 8-9 are block diagrams of example apparatuses for wireless communication, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a detection component 808, a suspension component 810, or an identification component 812, among other examples.

In some aspects, the apparatus 800 may be configured to perform one or more operations described herein in connection with FIGS. 5A-5B. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The detection component 808 may detect an out-of-coverage scenario based at least in part on determining that a synchronization source associated with a wireless network is unavailable or has a signal strength that fails to satisfy a threshold. The transmission component 804 may transmit, on a sidelink channel, a sidelink synchronization signal in a transmission period that includes a plurality of synchronization signal occasions based at least in part on the out-of-coverage scenario, wherein the sidelink synchronization signal is transmitted according to a reduced duty cycle that causes the sidelink synchronization signal to be transmitted during fewer than all of the plurality of synchronization signal occasions.

The transmission component 804 may refrain from transmitting the sidelink synchronization signal during one or more of the plurality of synchronization signal occasions based at least in part on the reduced duty cycle.

The reception component 802 may receive, from a roaming UE, signaling to indicate that the roaming UE is relying on the sidelink synchronization signal as a synchronization source.

The suspension component 810 may suspend the reduced duty cycle based at least in part on the signaling, wherein suspending the reduced duty cycle causes the sidelink synchronization signal to be transmitted in all of the plurality of synchronization signal occasions.

The suspension component 810 may start a timer based at least in part on suspending the reduced duty cycle, wherein the sidelink synchronization signal is transmitted in all of the plurality of synchronization signal occasions while the timer has not expired.

The suspension component 810 may reset the timer based at least in part on an event occurring prior to expiration of the timer, wherein the event includes one or more of a transmission to the roaming UE relying on the sidelink synchronization signal as a synchronization source, reception of a signal from the roaming UE relying on the sidelink synchronization signal as a synchronization source, or reception of signaling to indicate that one or more roaming UEs are relying on the sidelink synchronization signal as a synchronization source.

The suspension component 810 may reactivate the reduced duty cycle based at least in part on the timer expiring.

The identification component 812 may identify a set of roaming UEs that are relying on the sidelink synchronization signal as a synchronization source.

The suspension component 810 may reactivate the reduced duty cycle based at least in part on determining that the set is empty such that there are no roaming UEs relying on the sidelink synchronization signal as a synchronization source.

The identification component 812 may remove a particular roaming UE from the set of roaming UEs that are relying on the sidelink synchronization signal as a synchronization source based at least in part on the particular roaming UE failing to signal reliance on the sidelink synchronization signal within a configured time period or the particular roaming UE signaling non-reliance on the sidelink synchronization signal.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
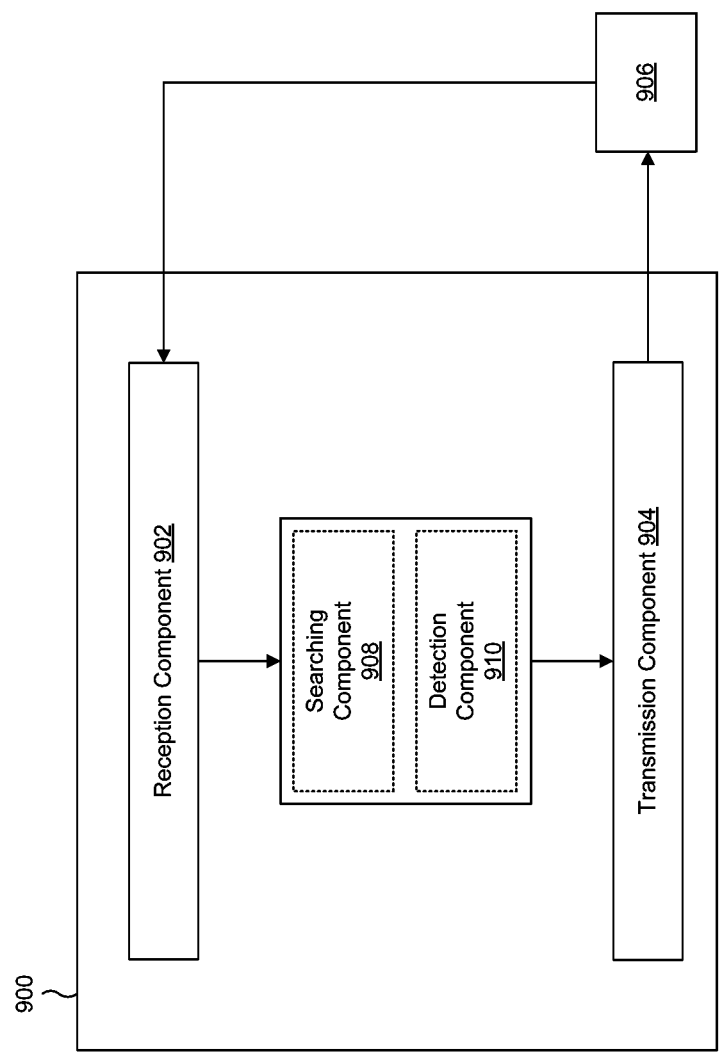

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a searching component 908 or a detection component 910, among other examples.

In some aspects, the apparatus 900 may be configured to perform one or more operations described herein in connection with FIGS. 5A-5B. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The searching component 908 may search for a synchronization signal based at least in part on determining that a synchronization source associated with a wireless network is unavailable or has a signal strength that fails to satisfy a threshold. The detection component 910 may detect, on a sidelink channel, a sidelink synchronization signal transmitted by a source UE in a transmission period that includes a plurality of synchronization signal occasions, wherein the sidelink synchronization signal is transmitted by the source UE according to a reduced duty cycle that causes the sidelink synchronization signal to be detected in fewer than all of the plurality of synchronization signal occasions. The transmission component 904 may transmit, to the source UE, signaling to indicate reliance on the sidelink synchronization signal as a synchronization source, wherein the signaling causes the source UE to suspend the reduced duty cycle such that the sidelink synchronization signal is transmitted in all of the plurality of synchronization signal occasions.

The transmission component 904 may transmit, to the source UE, signaling to indicate non-reliance on the sidelink synchronization signal based at least in part on detecting a synchronization signal from a synchronization source having a higher priority than the source UE.

The transmission component 904 may refrain from transmitting, to the source UE, signaling to indicate reliance on the sidelink synchronization signal based at least in part on detecting a synchronization signal from a synchronization source having a higher priority than the source UE.

The signaling to indicate reliance on the sidelink synchronization signal is periodically transmitted within a configured time period, and the reception component 902 may receive, from the source UE, information indicating the configured time period.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some aspects of the present disclosure:

Aspect 1: A method of wireless communication performed by a UE, comprising: detecting an out-of-coverage scenario based at least in part on determining that a synchronization source associated with a wireless network is unavailable or has a signal strength that fails to satisfy a threshold; and transmitting, on a sidelink channel, a sidelink synchronization signal in a transmission period that includes a plurality of synchronization signal occasions based at least in part on the out-of-coverage scenario, wherein the sidelink synchronization signal is transmitted according to a reduced duty cycle that causes the sidelink synchronization signal to be transmitted during fewer than all of the plurality of synchronization signal occasions.

Aspect 2: The method of aspect 1, wherein the sidelink synchronization signal includes one or more of a primary sidelink synchronization signal, a secondary sidelink synchronization signal, or a physical sidelink broadcast channel.

Aspect 3: The method of any of aspects 1-2, further comprising: refraining from transmitting the sidelink synchronization signal during one or more of the plurality of synchronization signal occasions based at least in part on the reduced duty cycle.

Aspect 4: The method of any of aspects 1-3, further comprising: receiving, from a roaming UE, signaling to indicate that the roaming UE is relying on the sidelink synchronization signal as a synchronization source; and suspending the reduced duty cycle based at least in part on the signaling, wherein suspending the reduced duty cycle causes the sidelink synchronization signal to be transmitted in all of the plurality of synchronization signal occasions.

Aspect 5: The method of any of aspects 1-4, further comprising: starting a timer based at least in part on suspending the reduced duty cycle, wherein the sidelink synchronization signal is transmitted in all of the plurality of synchronization signal occasions while the timer has not expired.

Aspect 6: The method of aspect 5, further comprising: resetting the timer based at least in part on an event occurring prior to expiration of the timer, wherein the event includes one or more of: a transmission to the roaming UE relying on the sidelink synchronization signal as a synchronization source, reception of a signal from the roaming UE relying on the sidelink synchronization signal as a synchronization source, or reception of signaling to indicate that one or more roaming UEs are relying on the sidelink synchronization signal as a synchronization source.

Aspect 7: The method of any of aspects 5-6, further comprising: reactivating the reduced duty cycle based at least in part on the timer expiring.

Aspect 8: The method of any of aspects 4-7, further comprising: identifying a set of roaming UEs that are relying on the sidelink synchronization signal as a synchronization source; and reactivating the reduced duty cycle based at least in part on determining that the set is empty such that there are no roaming UEs relying on the sidelink synchronization signal as a synchronization source.

Aspect 9: The method of aspect 8, further comprising: removing a particular roaming UE from the set of roaming UEs that are relying on the sidelink synchronization signal as a synchronization source based at least in part on the particular roaming UE failing to signal reliance on the sidelink synchronization signal within a configured time period or the particular roaming UE signaling non-reliance on the sidelink synchronization signal.

Aspect 10: A method of wireless communication performed by a UE, comprising: searching for a synchronization signal based at least in part on determining that a synchronization source associated with a wireless network is unavailable or has a signal strength that fails to satisfy a threshold; detecting, on a sidelink channel, a sidelink synchronization signal transmitted by a source UE in a transmission period that includes a plurality of synchronization signal occasions, wherein the sidelink synchronization signal is transmitted by the source UE according to a reduced duty cycle that causes the sidelink synchronization signal to be detected in fewer than all of the plurality of synchronization signal occasions; and transmitting, to the source UE, signaling to indicate reliance on the sidelink synchronization signal as a synchronization source, wherein the signaling causes the source UE to suspend the reduced duty cycle such that the sidelink synchronization signal is transmitted in all of the plurality of synchronization signal occasions.

Aspect 11: The method of aspect 10, wherein the sidelink synchronization signal includes one or more of a primary sidelink synchronization signal, a secondary sidelink synchronization signal, or a physical sidelink broadcast channel.

Aspect 12: The method of any of aspects 10-11, further comprising: transmitting, to the source UE, signaling to indicate non-reliance on the sidelink synchronization signal based at least in part on detecting a synchronization signal from a synchronization source having a higher priority than the source UE.

Aspect 13: The method of any of aspects 10-12, further comprising: refraining from transmitting, to the source UE, signaling to indicate reliance on the sidelink synchronization signal based at least in part on detecting a synchronization signal from a synchronization source having a higher priority than the source UE.

Aspect 14: The method of any of aspects 10-13, wherein the signaling to indicate reliance on the sidelink synchronization signal is periodically transmitted within a configured time period.

Aspect 15: The method of aspect 14, further comprising receiving, from the source UE, information indicating the configured time period.

Aspect 16: An apparatus for wireless communication at a device, comprising a processor; memory coupled with the processor; and instructions stored in the memory and executable by the processor to cause the apparatus to perform the method of any of aspects 1-9.

Aspect 17: A device for wireless communication, comprising a memory and one or more processors coupled to the memory, the memory and the one or more processors configured to perform the method of any of aspects 1-9.

Aspect 18: An apparatus for wireless communication, comprising at least one means for performing the method of any of aspects 1-9.

Aspect 19: A non-transitory computer-readable medium storing code for wireless communication, the code comprising instructions executable by a processor to perform the method of any of aspects 1-9.

Aspect 20: A non-transitory computer-readable medium storing a set of instructions for wireless communication, the set of instructions comprising one or more instructions that, when executed by one or more processors of a device, cause the device to perform the method of any of aspects 1-9.

Aspect 21: An apparatus for wireless communication at a device, comprising a processor; memory coupled with the processor; and instructions stored in the memory and executable by the processor to cause the apparatus to perform the method of any of aspects 10-15.

Aspect 22: A device for wireless communication, comprising a memory and one or more processors coupled to the memory, the memory and the one or more processors configured to perform the method of any of aspects 10-15.

Aspect 23: An apparatus for wireless communication, comprising at least one means for performing the method of any of aspects 10-15.

Aspect 24: A non-transitory computer-readable medium storing code for wireless communication, the code comprising instructions executable by a processor to perform the method of any of aspects 10-15.

Aspect 25: A non-transitory computer-readable medium storing a set of instructions for wireless communication, the set of instructions comprising one or more instructions that, when executed by one or more processors of a device, cause the device to perform the method of any of aspects 10-15.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   detecting an out-of-coverage scenario based at least in part on determining that a synchronization source associated with a wireless network is unavailable or has a signal strength that fails to satisfy a threshold; and transmitting, on a sidelink channel, a sidelink synchronization signal in a transmission period that includes a plurality of periodic synchronization signal occasions based at least in part on the out-of-coverage scenario, wherein the sidelink synchronization signal is transmitted according to a reduced duty cycle that causes the sidelink synchronization signal to be transmitted only during an on duration of the transmission period, wherein the on duration comprises of the plurality of periodic synchronization signal occasions, wherein the subset comprises two or more periodic synchronization signal occasions and the subset of the plurality of periodic synchronization signal occasions are periodic within the on duration.

2. The method of claim 1, wherein the sidelink synchronization signal includes one or more of a primary sidelink synchronization signal, a secondary sidelink synchronization signal, or a physical sidelink broadcast channel.

3. The method of claim 1, further comprising:
refraining from transmitting the sidelink synchronization signal during one or more of the plurality of periodic synchronization signal occasions based at least in part on the reduced duty cycle.

4. The method of claim 1, further comprising:
receiving, from a roaming UE, signaling to indicate that the roaming UE is relying on the sidelink synchronization signal as a synchronization source; and
suspending the reduced duty cycle based at least in part on the signaling, wherein suspending the reduced duty cycle causes the sidelink synchronization signal to be transmitted in all of the plurality of periodic synchronization signal occasions.

5. The method of claim 4, further comprising:
starting a timer based at least in part on suspending the reduced duty cycle, wherein the sidelink synchronization signal is transmitted in all of the plurality of periodic synchronization signal occasions while the timer has not expired.

6. The method of claim 5, further comprising:
resetting the timer based at least in part on an event occurring prior to expiration of the timer, wherein the event includes one or more of:
a transmission to the roaming UE relying on the sidelink synchronization signal as a synchronization source,
reception of a signal from the roaming UE relying on the sidelink synchronization signal as a synchronization source, or
reception of signaling to indicate that one or more roaming UEs are relying on the sidelink synchronization signal as a synchronization source.

7. The method of claim 5, further comprising:
reactivating the reduced duty cycle based at least in part on the timer expiring.

8. The method of claim 4, further comprising:
identifying a set of roaming UEs that are relying on the sidelink synchronization signal as a synchronization source; and
reactivating the reduced duty cycle based at least in part on determining that the set is empty such that there are no roaming UEs relying on the sidelink synchronization signal as a synchronization source.

9. The method of claim 8, further comprising:
removing a particular roaming UE from the set of roaming UEs that are relying on the sidelink synchronization signal as a synchronization source based at least in part on the particular roaming UE failing to signal reliance on the sidelink synchronization signal within a configured time period or the particular roaming UE signaling non-reliance on the sidelink synchronization signal.

10. A user equipment (UE) for wireless communication, comprising:
one or more memories; and
one or more processors operatively coupled to the one or more memories, the one or more memories and the one or more processors configured to:
detect an out-of-coverage scenario based at least in part on determining that a synchronization source associated with a wireless network is unavailable or has a signal strength that fails to satisfy a threshold; and
transmit, on a sidelink channel, a sidelink synchronization signal in a transmission period that includes a plurality of periodic synchronization signal occasions based at least in part on the out-of-coverage scenario, wherein the sidelink synchronization signal is transmitted according to a reduced duty cycle that causes the sidelink synchronization signal to be transmitted only during an on duration of the transmission period, wherein the on duration comprises a subset of the plurality of periodic synchronization signal occasions, wherein the subset comprises two or more periodic synchronization signal occasions and the subset of the plurality of periodic synchronization signal occasions are periodic within the on duration.

11. The UE of claim 10, wherein the sidelink synchronization signal includes one or more of a primary sidelink synchronization signal, a secondary sidelink synchronization signal, or a physical sidelink broadcast channel.

12. The UE of claim 10, wherein the one or more memories and the one or more processors are further configured to:
refrain from transmitting the sidelink synchronization signal during one or more of the plurality of periodic synchronization signal occasions based at least in part on the reduced duty cycle.

13. The UE of claim 10, wherein the one or more memories and the one or more processors are further configured to:
receive, from a roaming UE, signaling to indicate that the roaming UE is relying on the sidelink synchronization signal as a synchronization source; and
suspend the reduced duty cycle based at least in part on the signaling, wherein suspending the reduced duty cycle causes the sidelink synchronization signal to be transmitted in all of the plurality of periodic synchronization signal occasions.

14. The UE of claim 13, wherein the one or more memories and the one or more processors are further configured to:
start a timer based at least in part on suspending the reduced duty cycle, wherein the sidelink synchronization signal is transmitted in all of the plurality of periodic synchronization signal occasions while the timer has not expired.

15. The UE of claim 14, wherein the one or more memories and the one or more processors are further configured to:
reset the timer based at least in part on an event occurring prior to expiration of the timer, wherein the event includes one or more of:
a transmission to the roaming UE relying on the sidelink synchronization signal as a synchronization source, reception of a signal from the roaming UE relying on the sidelink synchronization signal as a synchronization source, or reception of signaling to indicate that one or more roaming UEs are relying on the sidelink synchronization signal as a synchronization source.

16. The UE of claim 14, wherein the one or more memories and the one or more processors are further configured to:

reactivate the reduced duty cycle based at least in part on the timer expiring.

17. The UE of claim 13, wherein the one or more memories and the one or more processors are further configured to:

identify a set of roaming UEs that are relying on the sidelink synchronization signal as a synchronization source; and reactivate the reduced duty cycle based at least in part on determining that the set is empty such that there are no roaming UEs relying on the sidelink synchronization signal as a synchronization source.

18. The UE of claim 17, wherein the one or more memories and the one or more processors are further configured to:

remove a particular roaming UE from the set of roaming UEs that are relying on the sidelink synchronization signal as a synchronization source based at least in part on the particular roaming UE failing to signal reliance on the sidelink synchronization signal within a configured time period or the particular roaming UE signaling non-reliance on the sidelink synchronization signal.

19. A method of wireless communication performed by a user equipment (UE), comprising:

searching for a synchronization signal based at least in part on determining that a synchronization source associated with a wireless network is unavailable or has a signal strength that fails to satisfy a threshold;

detecting, on a sidelink channel, a sidelink synchronization signal transmitted by a source UE in a transmission period that includes a plurality of periodic synchronization signal occasions, wherein the sidelink synchronization signal is transmitted by the source UE according to a reduced duty cycle that causes the sidelink synchronization signal to be detected only in an on duration of the transmission period, wherein the on duration comprises a subset of the plurality of periodic synchronization signal occasions, wherein the subset comprises two or more periodic synchronization signal occasions and the subset of the plurality of periodic synchronization signal occasions are periodic within the on duration; and transmitting, to the source UE, signaling to indicate reliance on the sidelink synchronization signal as a synchronization source, wherein the signaling causes the source UE to suspend the reduced duty cycle such that the sidelink synchronization signal is transmitted in all of the plurality of periodic synchronization signal occasions.

20. The method of claim 19, wherein the sidelink synchronization signal includes one or more of a primary sidelink synchronization signal, a secondary sidelink synchronization signal, or a physical sidelink broadcast channel.

21. The method of claim 19, further comprising:

transmitting, to the source UE, signaling to indicate non-reliance on the sidelink synchronization signal based at least in part on detecting a synchronization signal from a synchronization source having a higher priority than the source UE.

22. The method of claim 19, further comprising:

refraining from transmitting, to the source UE, signaling to indicate reliance on the sidelink synchronization signal based at least in part on detecting a synchronization signal from a synchronization source having a higher priority than the source UE.

23. The method of claim 19, wherein the signaling to indicate reliance on the sidelink synchronization signal is periodically transmitted within a configured time period.

24. The method of claim 23, further comprising receiving, from the source UE, information indicating the configured time period.

25. A user equipment (UE) for wireless communication, comprising:

one or more memories; and one or more processors operatively coupled to the one or more memories, the one or more memories and the one or more processors configured to:

search for a synchronization signal based at least in part on determining that a synchronization source associated with a wireless network is unavailable or has a signal strength that fails to satisfy a threshold;

detect, on a sidelink channel, a sidelink synchronization signal transmitted by a source UE in a transmission period that includes a plurality of periodic synchronization signal occasions, wherein the sidelink synchronization signal is transmitted by the source UE according to a reduced duty cycle that causes the sidelink synchronization signal to be detected only in an on duration of the transmission period, wherein the on duration comprises a subset of the plurality of periodic synchronization signal occasions, wherein the subset comprises two or more periodic synchronization signal occasions and the subset of the plurality of periodic synchronization signal occasions are periodic within the on duration; and transmit, to the source UE, signaling to indicate reliance on the sidelink synchronization signal as a synchronization source, wherein the signaling causes the source UE to suspend the reduced duty cycle such that the sidelink synchronization signal is transmitted in all of the plurality of periodic synchronization signal occasions.

26. The UE of claim 25, wherein the sidelink synchronization signal includes one or more of a primary sidelink synchronization signal, a secondary sidelink synchronization signal, or a physical sidelink broadcast channel.

27. The UE of claim 25, wherein the one or more memories and the one or more processors are further configured to:

transmit, to the source UE, signaling to indicate non-reliance on the sidelink synchronization signal based at least in part on detecting a synchronization signal from a synchronization source having a higher priority than the source UE.

28. The UE of claim 25, wherein the one or more memories and the one or more processors are further configured to:

refrain from transmitting, to the source UE, signaling to indicate reliance on the sidelink synchronization signal based at least in part on detecting a synchronization signal from a synchronization source having a higher priority than the source UE.

29. The UE of claim 25, wherein the signaling to indicate reliance on the sidelink synchronization signal is periodically transmitted within a configured time period.

30. The UE of claim 29, wherein the one or more memories and the one or more processors are further configured to:
  receive, from the source UE, information indicating the configured time period.

* * * * *